(12) United States Patent
De Roche (10) Patent No.: US 8,413,932 B2
(45) Date of Patent: Apr. 9, 2013

(54) PERIPHERAL CONTROL EJECTOR

(75) Inventor: Mark Stephen De Roche, Playa del Rey, CA (US)

(73) Assignee: Aerofex, Inc., Manhattan Beach, CA (US)

( * ) Notice: Subject to any disclaimer, the term of this patent is extended or adjusted under 35 U.S.C. 154(b) by 561 days.

(21) Appl. No.: 12/793,590

(22) Filed: Jun. 3, 2010

(65) Prior Publication Data

US 2011/0250066 A1 Oct. 13, 2011

Related U.S. Application Data

(60) Provisional application No. 61/342,210, filed on Apr. 10, 2010.

(51) Int. Cl.
*B64C 27/08* (2006.01)

(52) U.S. Cl.
USPC .......................... 244/221; 244/17.23

(58) Field of Classification Search .............. 244/110 B, 244/17.11, 6, 7 R, 7 B, 7 A, 12.1–12.5, 17.23, 244/17.25, 207, 53 B; 60/226.2, 228
See application file for complete search history.

(56) References Cited

U.S. PATENT DOCUMENTS

| | | | | |
|---|---|---|---|---|
| 2,567,392 A * | 9/1951 | Naught ....................... 244/23 C |
| 2,953,321 A | 9/1960 | Robertson et al. |
| 3,489,374 A * | 1/1970 | Morcom ....................... 244/12.2 |
| 3,568,358 A * | 3/1971 | Bruce ............................. 446/37 |
| 3,614,037 A * | 10/1971 | Vdolek ..................... 244/110 B |
| 3,747,875 A * | 7/1973 | Stevens ....................... 244/53 R |
| 3,785,592 A * | 1/1974 | Kerruish ..................... 244/12.2 |
| 3,838,835 A * | 10/1974 | Kling ........................... 244/23 C |
| 3,915,412 A * | 10/1975 | Tibbs ............................. 244/207 |
| 4,132,240 A * | 1/1979 | Frantz ........................... 137/15.1 |
| 4,358,074 A * | 11/1982 | Schoen et al. ............... 244/12.4 |
| 4,371,132 A * | 2/1983 | Woodward .................. 244/53 B |
| 4,637,801 A * | 1/1987 | Schultz ........................... 440/67 |
| 4,796,836 A * | 1/1989 | Buchelt ....................... 244/23 R |
| 5,035,377 A * | 7/1991 | Buchelt ....................... 244/12.1 |
| 5,598,701 A * | 2/1997 | Newton ...................... 60/226.2 |
| 5,860,276 A | 1/1999 | Newton |
| 6,450,445 B1 * | 9/2002 | Moller ....................... 244/23 A |
| 6,464,166 B1 | 10/2002 | Yoeli |
| 6,547,180 B1 * | 4/2003 | Cassidy ...................... 244/12.5 |
| 6,817,570 B2 | 11/2004 | Yoeli |
| 2002/0047071 A1 * | 4/2002 | Illingworth .................. 244/199 |
| 2004/0068978 A1 | 4/2004 | Lair et al. |
| 2004/0079073 A1 * | 4/2004 | Ramlaoui et al. ........... 60/226.2 |
| 2009/0151320 A1 | 6/2009 | Sternberger |

OTHER PUBLICATIONS

T.W. Sheehy, Computer Aided Shrouded Propeller Design, AIAA 9*th* Annual Meeting and Technical Display, Jan. 8-10, 1973, pp. 1-6, Washington, D.C.

(Continued)

*Primary Examiner* — Tien Dinh
*Assistant Examiner* — Justin Benedik
(74) *Attorney, Agent, or Firm* — Patent Law Office of David G. Beck (57) ABSTRACT

A system for augmenting ducted fan thrust is provided, the system including a peripheral ejector comprised of inner and outer cowling members. With the addition of actuators mounted between the trailing edges of the inner and outer cowling members, the system may be used to generate control moments in the ducted fan. The peripheral ejector may be segmented to form discrete ejector control sections.

29 Claims, 7 Drawing Sheets

OTHER PUBLICATIONS

P.M. Bevilaqua, Advances in Ejector Thrust Augmentation, Dec. 1987, pp. 375-405, SAE International.

J. Fleming et al., Improved Control of Ducted Fan VTOL UAVs in Crosswind Turbulence, AHS 4$^{th}$ Decennial Specialist's Conference on Aeromechanics, Jan. 21-23, 2004, pp. 1-12, San Francisco, CA.

J. Fleming et al., Improving Control System Effectiveness for Ducted Fan VTOL UAVs Operating in Crosswinds, 2$^{nd}$ AIAA Unmanned Unlimited Systems, Technologies, and Operations—Aerospace, Sep. 15-18, 2003, pp. 1-11, San Diego, CA.

P.J. Vermeulen et al., Air Ejector Pumping Enhancement Through Pulsing Primary Flow, 2$^{nd}$ AIAA Flow Control Conference, Jun. 28-Jul. 1, 2004, pp. 1-9, Portland, OR.

R.J. Weir, Aerodynamic Design Considerations for a Free-Flying Ducted Propeller, AIAA Atmospheric Flight Mechanics Conference, Aug. 15, 1988, pp. 420-431, Minneapolis, MN.

P.G. Parikh et al., Resonant Entrainment of a Confined Pulsed Jet, J. Fluids Eng., Dec. 1982, pp. 482-491, vol. 104, Issue 4.

K.S. Nagaraja, Advances in Ejector Technology—A Tribute to Hans von Ohain's Vision, Final Report from Air Force Wright Aeronautical Labs Wright-Patterson AFB, Jun. 1982, pp. 490-517.

H.S. Fowler, Thrust Systems for Light Air Cusion Vehicles, 1974, pp. 1-40.

* cited by examiner

PERIPHERAL CONTROL EJECTOR

CROSS-REFERENCES TO RELATED APPLICATIONS

This application claims the benefit of the filing date of U.S. Provisional Patent Application Ser. No. 61/342,210, filed Apr. 10, 2010, the disclosure of which is incorporated herein by reference for any and all purposes.

FIELD OF THE INVENTION

The present invention relates generally to ducted fans and, more particularly, to a method and apparatus for generating control moments in a ducted fan.

BACKGROUND OF THE INVENTION

A ducted fan is a mature propulsion technology that offers a number of advantages over non-ducted fans and propellers in terms of efficiency, noise and safety. As such, ducted fans have been used in a variety of manned and unmanned aircraft, airboats and hovercraft.

Low aspect ratio ducts, those with large chords with respect to their diameters, are often employed in craft designed to transition from powered vertical flight to horizontal flight and back, as the large chord of the duct adds wing area in horizontal flight. In addition, low-aspect ratio ducts also accommodate counter-rotating propellers or stator blades that reduce the swirling flow coming off the propeller, thereby straightening the airflow before it exits the duct. Straightening the exiting airflow enhances both thrust and efficiency. While there is drag associated with placing stator blades in the fan downwash, this effect may be partially offset through stator shaping.

In contrast, the airflow from high aspect ratio ducts, i.e., those with very short chords with respect to their diameters, typically exhibit high levels of swirl that are not easy to counter since the short chord makes it difficult to mount effective stators or counter-rotating propellers within the duct. The swirl from such a ducted fan can present a number of problems, especially those related to ground effect. These problems may be further exacerbated if the fan uses conventional control surfaces. The advantage, however, of high aspect ratio ducts is that the static thrust of the fan or propeller is increased while the momentum drag at high forward speeds may be reduced.

Ejector technology is a mature aerodynamic concept in which the thrust of a jet stream is increased by increasing the momentum flow through entrainment. Unfortunately, the increased thrust is typically gained at the expense of weight and drag and the volumetric penalties incurred in installation. Additionally, ejectors generally require long diffuser and mixing sections in order to achieve adequate augmentation, thus making them difficult to integrate into a realistic aircraft configuration.

Initial research on ejector technology focused on understanding and increasing the available augmentation. It was found that the mechanism of entrainment that leads directly to augmentation could be improved through the introduction of vortices, i.e. spinning flow. More recently, investigators have discovered the potent effect of pulsating flow or "pumping" on turbulent mixing efficiency, which is now known to be one of the predominant mechanisms of ejector effectiveness. While initial studies indicated that augmentation could be optimized with pumping frequencies of approximately 110-135 Hz, subsequent research demonstrated that even greater gains could be achieved by selectively tuning the pulse frequency to match the characteristics of the ejector cavity. The issue associated with pumping is that most ejector applications use a jet stream as the primary flow, making it difficult and intrusive to oscillate.

In powered-lift aircraft, the primary thrust vector is generally pointed vertically toward the ground. This implies that when a ducted fan is employed for primary lift, the lifting plane is essentially parallel to the horizon. The general control philosophy is to modify the thrust vector of the ducted fan in order to control the direction of the vehicle. To change altitude is therefore a simple matter of varying engine throttle or a collective change of fan blade pitch. It is much more difficult, however, to exert control forces in the remaining degrees of freedom.

To move fore, aft or laterally with respect to the horizon, or in the lift plane of the ducted fan, is to typically tilt the duct and rotate its thrust to "push" the fan in the desired direction. The significance of this technique is that lateral forces are created by tilting, and the tilting is accomplished by generating rotational moments whose axis is in the plane of the duct normal to the lateral direction. Accordingly, generating control forces is actually a problem of generating rotational moments.

Due to the complexity of articulated rotors, most ducted fan aircraft employ a fixed pitch propeller and aerodynamic control surfaces mounted within either the downwash or the inlet side of the duct to provide control moments in all three axes. As a consequence of this approach, at times the control surfaces are required to induce multiple control moments at once, e.g., yaw and rolling to provide a coordinated turn. This, in turn, can lead to the saturation of the control surfaces, an issue that must be taken into account during design and operation of the vehicle in order to avoid reduction or loss of control authority during flight.

In order for control surfaces mounted in the downwash to be effective, preferably they are placed between 1.5 and 2.0 rotor diameters behind the duct exit plane. Therefore, a vehicle's height may be significantly increased. While such a height increase may be acceptable for small diameter fans, with larger diameter fans such a configuration is impractical.

Ground effects introduce yet another issue relating to the use of aerodynamic control surfaces in a ducted fan vehicle. More specifically, the interaction of the downwash with the ground impinges on the control surfaces at angles different from those encountered during normal flight, potentially rendering the surfaces ineffective by reducing or reversing their moments. To reduce this effect, many ducted fan vehicles stand tall on their gear to keep the control surfaces in clean air and minimize ground effects. Alternately, the vehicles may use a specially designed launch platform that limits the adverse flight characteristics that may be present near the ground.

Another subtlety associated with aerodynamic control surfaces occurs when they are used with a high-aspect ratio duct. In this case, the inherent swirl of the downwash into which the control surfaces are placed limits their effective range of angle of attack, as small changes can stall portions of the surface.

One approach that has been used successfully to counter these effects is to place the control surfaces above the ducted fan on the inlet side where the flow is still generally perpendicular to the lift plane. This technique is equally effective for high and low-aspect ratio ducts, as the inlet flow is devoid of swirl. The downside to mounting the control surfaces in the inlet side is that due to the slower airflow above the duct, larger control surfaces are required in order to provide the desired level of control. This effect can be managed, to a degree, by lowering the control surfaces into the duct where the inlet velocity more closely matches the outlet velocity.

A bigger issue associated with placing the control surfaces at the duct inlet is coordination between the control surfaces and the vehicle center-of-gravity (CG), such coordination being required to avoid the introduction of control coupling. Control coupling occurs when a desired output (e.g., roll right) is accompanied by an unintended response (e.g., pitch) that must be compensated for by the pilot or control system. Coordination between the control surfaces and the CG is complicated by the fact that the CG changes during flight and vehicle operation, for example due to fuel use or payload being loaded or removed. As the CG moves away from its initial position, the moment arm to the lifting plane changes length accordingly, changing the coupling moment in pitch or roll. Worse, if the CG were to move above or below the lifting plane from its initial position, the direction of the moments would reverse. Due to these issues, control surfaces in the duct inlet are primarily used for yaw control as yaw control is less affected by vehicle CG and the associated aerodynamic forces can be balanced radially across the duct or ducts.

Although a variety of different approaches have been studied to solve these control issues, to date they have met with limited success. Accordingly, what is needed is an improved control system for use with a ducted fan. The present invention provides such a system.

SUMMARY OF THE INVENTION

An airflow augmentation system for a ducted fan is provided, the system including inner and outer cowling members mounted adjacent to the inside and outside surfaces of the fan duct, respectively. The inner cowl is mounted within the downwash of the propeller and the trailing edges of both the inner and outer cowling members extend below the trailing edge of the duct. The leading edge of the inner cowling member may be separated from the propeller plane by a distance equal to or less than $1/10$ of the propeller chord length measured at the leading edge of the inner cowling member. The inner surface of the inner cowl may be substantially parallel to the inner surface of the trailing edge of the duct. The inner surface of the inner cowl may form an angle of less than 18 degrees, and preferably within the range of 15 to 18 degrees, with the central inner surface of the duct. The inner surface of the inner cowl may be separated from the adjacent inner surface of the duct by a distance of at least 10% of the propeller's radius, and more preferably separated by a distance of between 5% and 15% of the propeller's radius. The inner surface of the inner cowl may be separated from the adjacent inner surface of the duct by a distance sufficient to capture at least 20% of the airflow created by the propeller. The leading edge of the outer cowling member may be substantially parallel to the adjacent duct surface and the trailing edge of the outer cowling member may be substantially parallel to the trailing edge of the inner cowling member.

In another aspect of the airflow augmentation system, the inner cowling may be mounted to the duct using a plurality of inner cowling stand-offs and the outer cowling may be mounted to the duct using a plurality of outer cowling stand-offs. Adjacent inner cowl and outer cowl stand-offs may be formed from a single stand-off.

In another aspect of the airflow augmentation system, the inner cowling member may include multiple pluralities of holes that act to reattach separated airflow. Each plurality of holes of the multiple pluralities may be located proximate to the intersection of the inner cowling member and a cowling member stand-off.

In another aspect of the airflow augmentation system, the system includes a plurality of actuators, each of which is mounted between the trailing edges of the inner and outer cowling members. Each actuator may be positioned between a first, open, position and a second, closed, position. In the first position, each actuator presents minimal profile, and thus drag, to airflow passing between the duct and the inner cowl. In the second position, the actuator redirects airflow entering between the inner cowl and the duct outboard between the outer cowl and the duct. The actuators may be curvilinear where the cylindrical axis corresponding to the curvilinear shape may be parallel to the downward vector when the actuator is in the open position. The actuators may be coupled to a control system, the control system allowing a user to select the position of each actuator individually, or by actuator grouping. Preferably the actuator groups are grouped by ejector control section, where each ejector control section is comprised of a portion of the inner cowling, a portion of the outer cowling, and cowling stand-offs at either section end. The control system may use control cables or electro-mechanical servos to control the position of each actuator.

A further understanding of the nature and advantages of the present invention may be realized by reference to the remaining portions of the specification and the drawings.

DESCRIPTION OF THE SPECIFIC EMBODIMENTS

In the following text, the terms "center-of-gravity" and "CG" may be used interchangeably herein. Similarly, the terms "propeller" and "fan" may be used interchangeably herein. Note that identical element symbols used on multiple figures refer to the same component, or components of equal functionality. Additionally, the accompanying figures are only meant to illustrate, not limit, the scope of the invention and should not be considered to be drawn to scale.

The ducted fan control methodology described herein operates by capturing the tip portion of the propeller downwash at the plane of the propeller, and augmenting this flow for thrust and control. The captured flow can be redirected, on command, peripherally about the duct to provide pitch and roll moments as well as thrust throttling. As such, the system approaches the capabilities of an articulated rotor, while retaining the benefits of a ducted fan. The means for achieving these benefits is via a peripheral ejector affixed to the trailing edge of the duct with actuators in the mixing section. The peripheral ejector of the present invention provides several benefits over the prior art configurations. First, due to the added augmentation of the ejector, it increases the control forces over that which would be realizable by simply reversing the flow. Second, when air is allowed to pass through the duct without diversion, i.e., with no control input, the ejector is shaped to straighten and entrain ambient air outboard of the duct into the flow-field, increasing thrust and offsetting the weight and drag of the system. Third, as forces generate the greatest moments the further they act from the axis of rotation, the peripheral location of the ejector creates the maximum moment from the force available from the propeller flow. Fourth, as the mechanisms required to divert the flow are small in mass and inertia and are affixed to stationary components rather than the rotating propeller, they are ideal candidates for electromechanical actuation.

Figure 1:
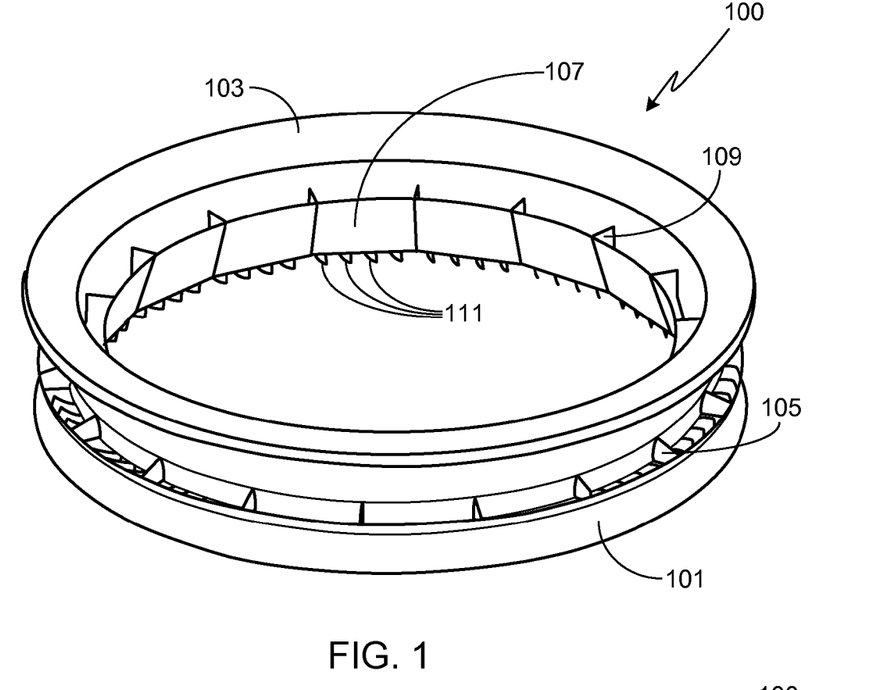
FIG. 1 provides a perspective view of a fan duct in accordance with a preferred embodiment of the invention.
Figure 2:
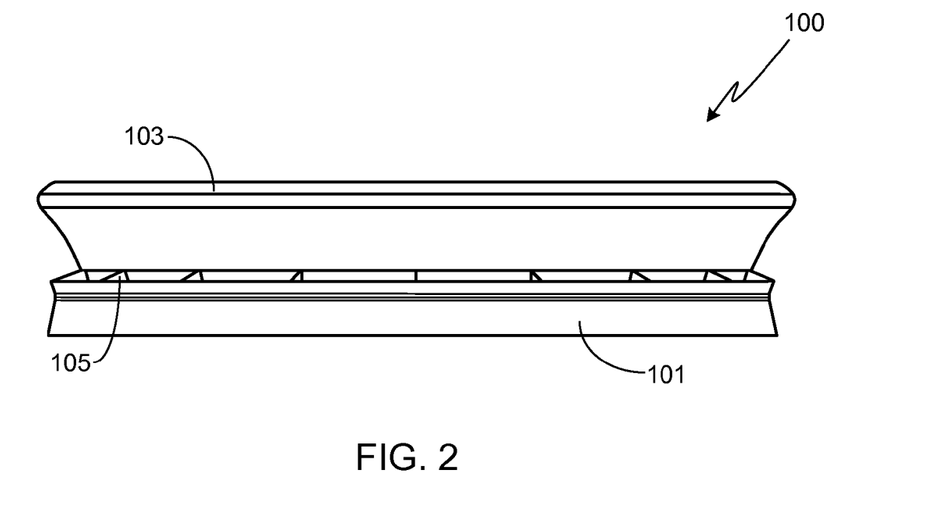
FIG. 2 provides a side view of the fan duct shown in FIG. 1.

FIGS. 1 and 2 provide perspective and side views, respectively, of a preferred embodiment of the invention. Note that in these figures as well as some of the other figures provided herein, the propeller is not shown within the duct, thus simplifying the figures in question.

In accordance with the invention, ducted fan system 100 includes an outer cowl 101 that is affixed to the trailing edge of the outer periphery of duct 103, for example using multiple mounting stand-offs 105. Similarly, an inner cowl 107 is affixed to the trailing edge of the inner periphery of duct 103 using multiple mounting stand-offs 109. As described and illustrated in detail below, a single stand-off may be used that provides means for attaching both outer cowl 101 and inner cowl 107 to duct 103, thereby replacing individual stand-offs 105 and 109. Actuators 111, critical to the use of the ejectors as a control system, are not visible in FIG. 2 and are only partially visible in FIG. 1.

As shown, outer cowl member 101 and inner cowl member 107 are divided into a plurality of discrete control sections, the individual control sections defined by the cowling mounting stand-offs, i.e., stand-offs 105 and 109. Accordingly, it is preferred that mounting stand-offs 105 and 109 be aligned, as shown, and more preferably, comprised of a single sheet of material. To a degree, the number of control sections determines the level of fine control that may be exerted by the control system. Given the trade-off between system complexity and control sensitivity, and given the level of control required by most applications, the inventor has found that in at least one preferred embodiment the circumference of the fan should be divided into eighteen, 20-degree control sections.

Figure 3:
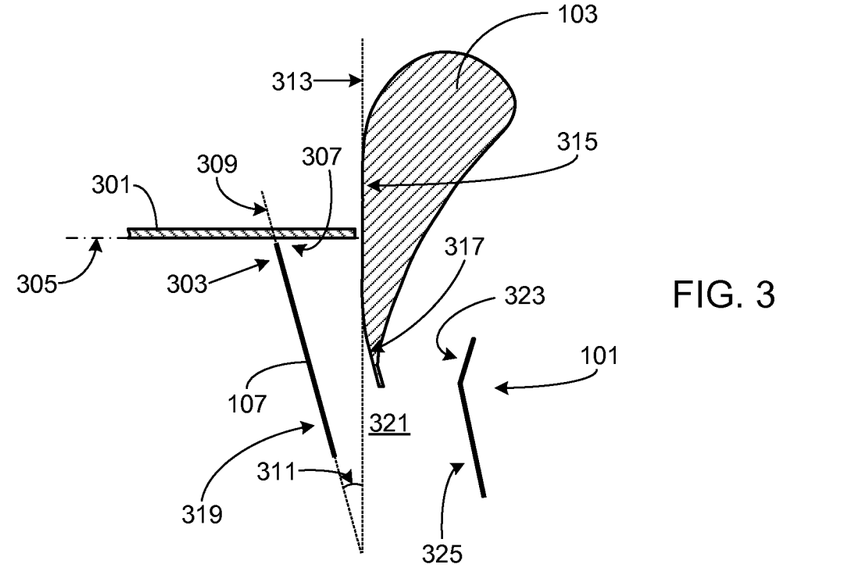
FIG. 3 provides a cross-sectional view of a control section, this view not showing the cowling stand-offs.
Figure 4:
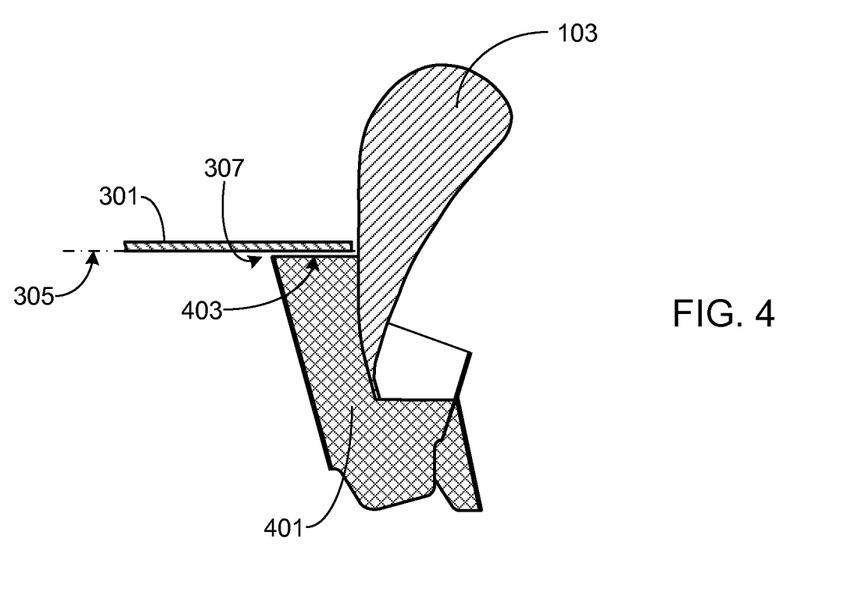
FIG. 4 provides the same cross-sectional view of the control section as that shown in FIG. 3, with the inclusion of cowling stand-offs.

FIGS. 3 and 4 provide cross-sectional views of a control section. While FIG. 3 only shows the cowling control surfaces associated with this particular control section, FIG. 4 also includes cowling stand-off 401. For reference, these figures include propeller tip 301. As noted above, inner cowl 107 is a peripheral element that resides in the propeller downdraft, attached to the duct via mounting stand-off 401 in FIG. 4. The leading edge 303 of inner cowl 107 and the leading edge 403 of stand-off 401 extend nearly up to the plane 305 of propeller 301, leaving only a small clearance 307 between propeller plane 305 and leading edges 303 and 403. Spacing 307 is sufficient to prevent interference between the rotating propeller 301 and inner cowl 107/stand-off 401. Preferably spacing 307 is on the order of 1/10 of the propeller chord as measured at the ejector inlet lip. In a preferred embodiment of the invention, spacing 307 is approximately 0.25 inches.

As inner cowl 107 permanently resides in the propeller downwash, it is important that it be designed to minimize the drag it imparts to the ducted fan. As shown in FIG. 3, the plane 309 of inner cowling 107 forms a divergent angle 311 with the plane 313 that corresponds to the central wall portion 315 of duct 103. Preferably angle 311 is approximately 15 degrees, and generally no greater than 18 degrees, in order to prevent drag producing separation. Note that in the illustrated embodiment of the invention, and as preferred, the surface of inner cowl 107 is approximately parallel to the duct's trailing edge 317. Although leading edges 303 and 403 must be in close proximity to the propeller plane as noted above, the total height of cowling 107 should be kept as small as possible to minimize parasitic drag. The trailing edge 319 of inner cowling 107 extends below the trailing edge 317 of duct 103 to form the mixing region 321.

Preferably inner cowling 107 is configured to capture between 10% and 20% of the airflow created by propeller 301, and more preferably approximately 20% of the airflow created by propeller 301. Accordingly, assuming a uniform airflow from the propeller and across the duct, the separation distance between the inlet of the inner cowling 107 and the inner duct surface 315 is between 5% and 10% of the propeller radius, and more preferably on the order of 10% of the propeller radius.

Outer cowling 101 is a peripheral element located outboard of duct 103. Preferably, the same mounting stand-off 401 is used with both inner cowl 107 and outer cowl 101, as shown in FIG. 4. As the outer cowling 101 does not need to extend up to the plane 305 of propeller 301, it may be shorter than inner cowling 107 as shown. The outer cowl 101 is convergent-divergent in cross-section. Leading edge 323 of cowling 101 is approximately parallel to the adjacent exterior surface of duct 103, while the trailing edge 325 of cowling 101 is approximately parallel to the trailing edge 319 of inner cowl 107. The outer cowling 101 serves two purposes. First, it redirects the airflow that is diverted by the actuator, as described in detail below. Second, it forms the outboard wall of the ejector as it is shaped to entrain ambient air when the flow through the device is not diverted by the actuator.

Cowling stand-offs 401, or individual cowling stand-offs 105 and 109, are located radially along the duct trailing edge and act as structural supports for the ejectors, i.e., for inner cowl 107 and outer cowl 101. The stand-offs straighten the airflow entering the ejector while providing an end plate for each ejector cavity, thereby essentially isolating each ejector cavity from the adjacent ejector cavity.

Figure 5:
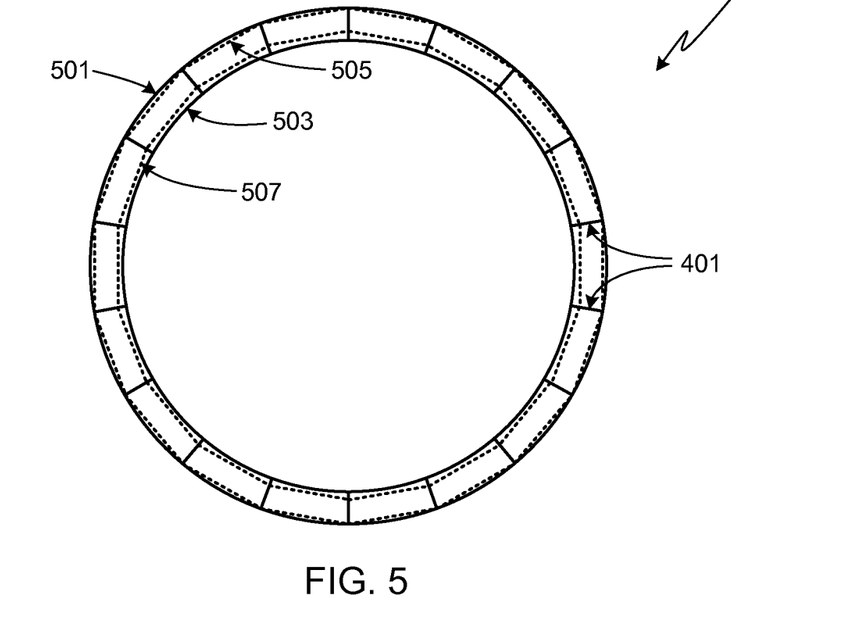
FIG. 5 provides a top view of the ejectors.

Together, inner cowling 107 and outer cowling 101 form a convergent cone in cross-section about the entire periphery of the trailing edge 317 of duct 103, the top of the convergent cone being open on either side of duct 103 as shown. The distance of each cowling member from the duct is preferably constant so that the airflow path is unobstructed and does not generate backpressure. The inner and outer cowls are preferably shaped such that when combined together with the mounting stand-offs the exit region of each ejector cavity is rectangularly-shaped, this exit region occurring at the convergent throat of the cavity. This aspect of the invention is illustrated in FIG. 5, this figure providing a top view of the ejector. Note that this figure does not include the duct, propeller or actuators. As shown, in this preferred embodiment of the invention, the leading edge 501 of outer cowl 101 and the leading edge 503 of inner cowl 107 are curvilinear and substantially parallel to the outer and inner surfaces, respectively, of the duct. In contrast, the trailing edge 505 of outer cowl 101 and the trailing edge 507 of inner cowl 107 are linear and, together with the mounting stand-offs 401, form a rectangular ejector throat. Note that trailing edges 505 and 507 are shown as dashed lines in FIG. 5 for clarity and so that they are easily distinguishable from the leading edges of the cowlings. The transition to a rectangular throat simplifies actuator design and augments mixing of the entrained ambient air, thereby increasing ejector thrust. The significance of the rectangular cross-section of the ejector throat becomes apparent when the actuators are activated, also referred to herein as deployed, since in this position the edges of the actuators lay tangent to the squared walls to form the close-out that redirects flow.

Figure 6:
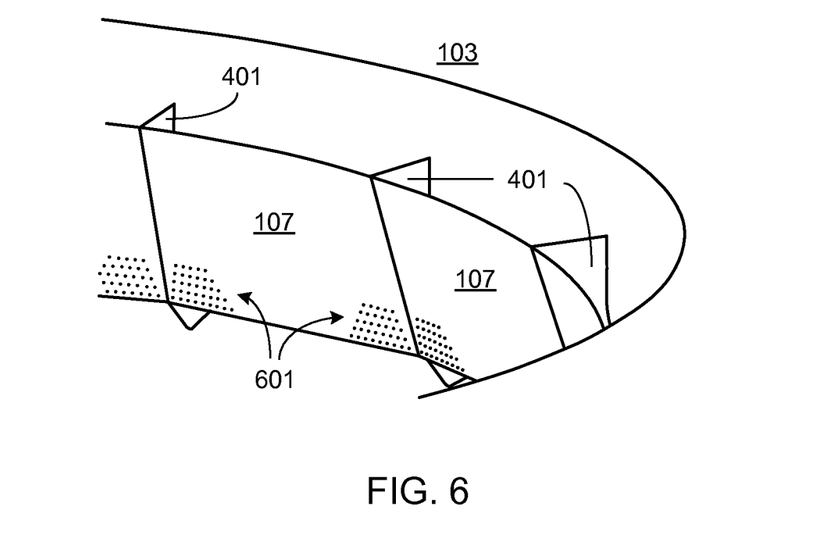
FIG. 6 provides a perspective view of a portion of the embodiment shown in FIG. 1, this figure illustrating the holes within the inner cowling that are used to reattach separated airflow.

The divergent-convergent section formed by the cowlings increases the capture angle of inner cowling 107, while avoiding separation. As the convergent section of the cowlings increases the velocity of the flow within it, there is a corresponding pressure drop within this section. In at least one preferred embodiment, inner cowling 107 includes a plurality of small holes 601 at the inner section as illustrated in FIG. 6. Preferably holes 601 are approximately 0.040 inches in diameter, spaced approximately 0.3 inches apart, and located in the corners where the capture angle is greatest and therefore the most likely area of flow separation. Due to the pressure differential, holes 601 create a suction of the internal duct flow, thereby acting to reattach any separated flow and allowing a greater angle than detachment would normally permit. This method increases the capture area of the ejector while allowing the actuators to retain their small size.

Figure 7:
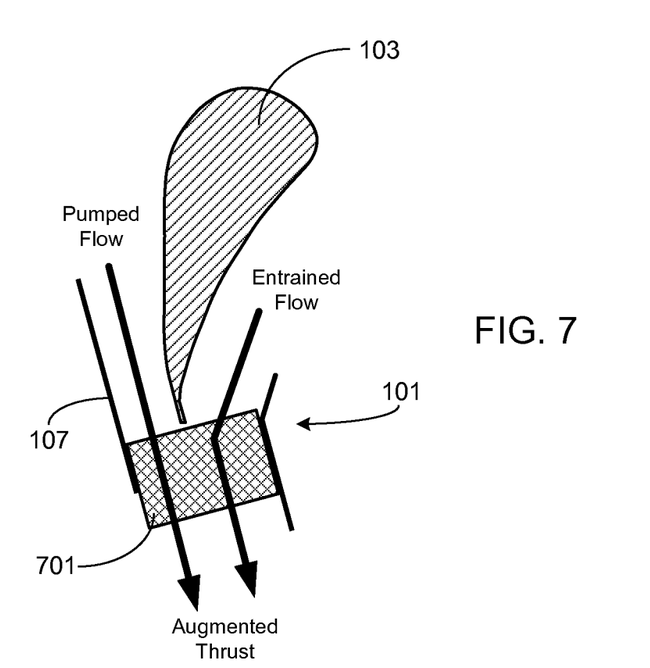
FIG. 7 provides the cross-sectional view of the control section shown in FIG. 3 with the addition of an actuator in the open position.
Figure 8:
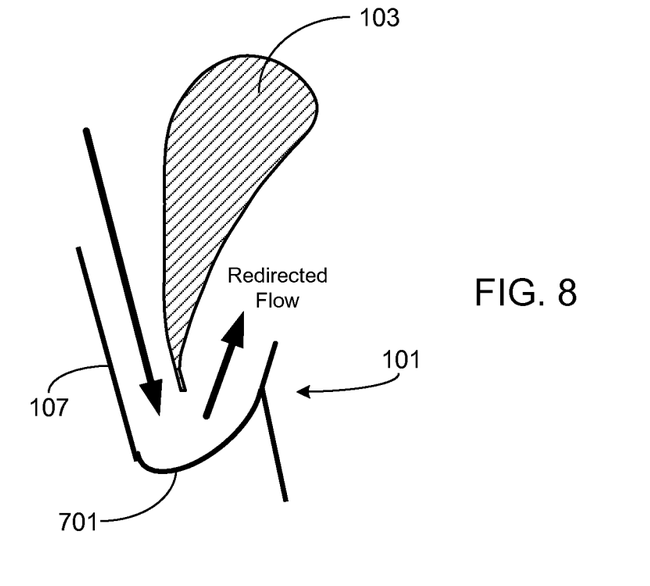
FIG. 8 provides the cross-sectional view of the control section shown in FIG. 3 with the addition of an actuator in the closed position.
Figure 9:
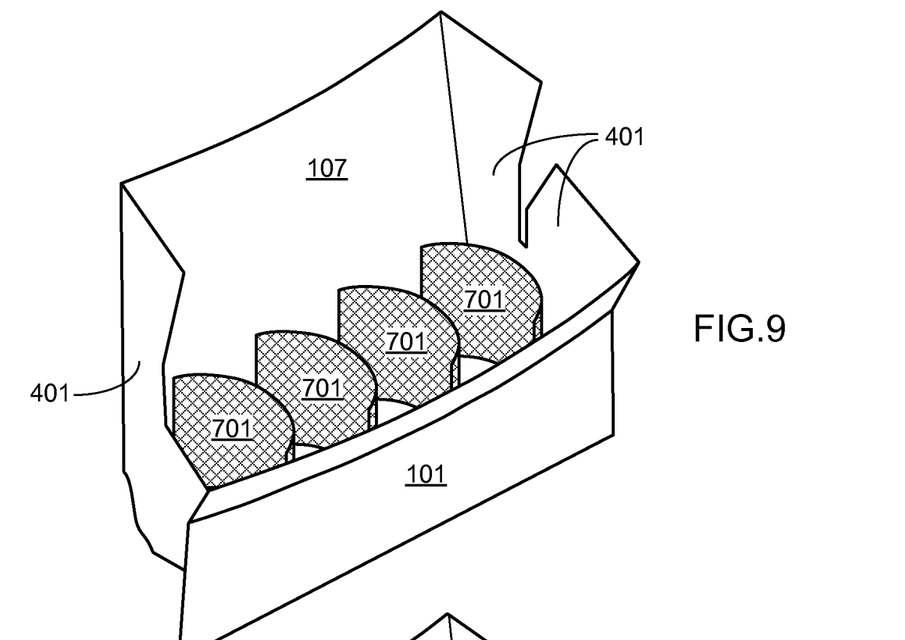
FIG. 9 provides a perspective view of an ejector control section with four actuators, all in the open position.
Figure 10:
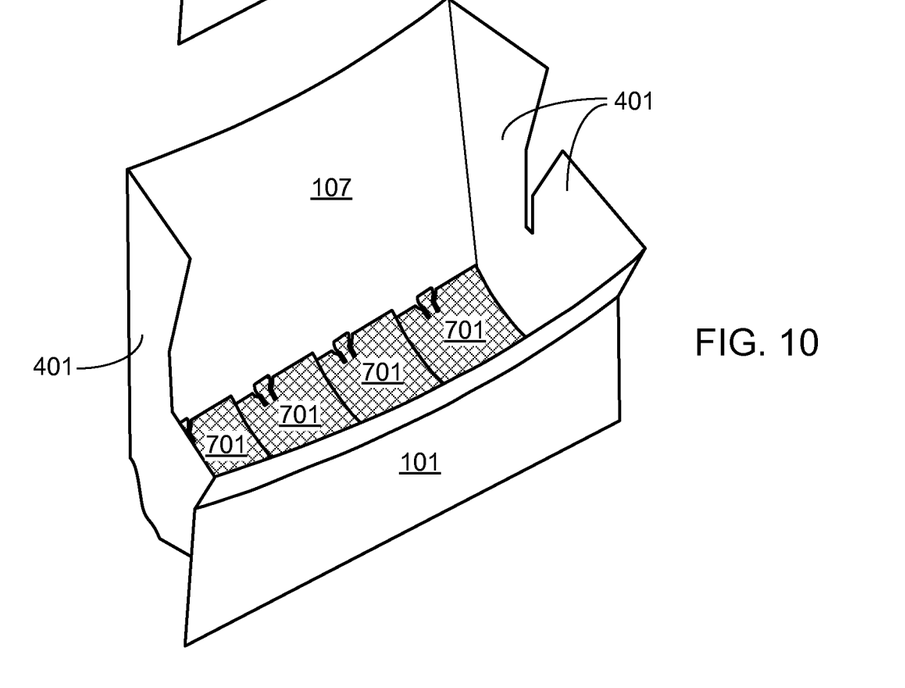
FIG. 10 provides a perspective view of an ejector control section with four actuators, all in the closed position.

FIGS. 7-10 illustrate a preferred actuator configuration. FIGS. 7 and 8 are based on the cross-sectional view previously provided in FIG. 3, with the addition of actuator 701. FIGS. 9 and 10 provide a perspective view of an ejector control section with four actuators. FIGS. 7 and 9 show the actuators in the 'open' position, which allows air to flow freely between them. FIGS. 8 and 10 show the actuators in the 'closed' position, thus causing the air to be redirected. Note that duct 103 is not shown in FIGS. 9 and 10 in order to present a clearer view of the actuators.

The preferred actuator embodiment is one consisting of three or four curvilinear surfaces 701 placed in the mixing region. When the actuators are in the open position, also referred to herein as the un-deployed position, as shown in FIGS. 7 and 9, the cylindrical axis of each actuator is parallel to the downward vector of the primary airflow stream. As such, each actuator presents a minimal profile, and therefore minimal drag. The curvilinear shape of each actuator directs primary airflow outboard and generates vortices that enhance mixing with the entrained flow, resulting in greater thrust augmentation. The effect also entrains fan flow to straighten and direct it outboard due to the exposure of the inner portion of each actuator to the fan flow.

When closed, also referred to herein as being deployed, each actuator is rotated approximately 90 degrees as shown in FIGS. 8 and 10. As a result of this shift in position, the long axial edges of each actuator are caused to essentially rest against the rectangular sides of the cowling opening, thus obstructing the convergent section airflow and redirecting it toward the outboard cowling (see FIG. 8). As the change in flow path by each actuator is constant in area and downwind of the convergence formed between the inner cowling 107 and duct 103, the propeller experiences no backpressure or adverse feedback from the operation of the actuator.

Due to the small size of each actuator, the actuators are capable of rapidly switching from one position (e.g., open) to the alternate position (e.g., closed). Assuming the use of control cables, the limited movement required to change actuator positions simplifies control system design as very little control cable travel is required to effect actuator movement. Preferably the control system is designed to neutralize the aerodynamic loads acting upon the actuators so that the actuators favor neither the open nor closed position, thereby minimizing control system loading. The result of such a configuration is a system that is amenable to both servo-control and traditional control cables.

While the curvilinear shaped actuators shown in FIGS. 7-10 are preferred, it will be appreciated that the invention is not limited to a specific actuator shape. For example, the actuators may be shaped as an upside down hinge. When deployed, such an actuator would split open and cover the bottom opening of the cone, redirecting flow out the top of the outer cowling, outboard of the duct. In the stowed or open position, the actuator would be located tangent to the trailing edge of the duct at approximately the center of the cone formed by the cowlings. As such, in the stowed position the actuator would present a small streamline profile to the flow, thereby minimizing drag. Such actuator placement would insure that it is out of the primary flow when not in use, and it is angled such that it is parallel to the flow, which is essentially the same as the divergence angle.

During operation, each propeller blade passes over each ejector inlet formed by inboard cowling 107, duct 103 and stand-offs 401. This primary airflow is directed outboard by the inboard cowling 107 and through the convergent section 321 of the ejector. At the trailing edge of the duct, the cavity formed by the outboard cowling 101 and the outboard surface of duct 103 comes into communication with the primary flow at the convergent section 321. This results in an entrainment of the secondary outboard flow into the primary flow which leads to thrust augmentation (e.g., see FIGS. 3 and 7).

The mechanism for entrainment and therefore thrust augmentation is through shear mixing of the primary flow with the outboard flow. Augmentation can be increased by enhancing the mixing, for example by optimizing the actuators that reside within the mixing area. Additionally, augmentation may be increased by adjusting the pumping frequency of the primary flow.

As opposed to a true jet stream, the primary flow through each peripheral ejector of the present invention is not of constant velocity since the airflow is driven by the blades of a propeller or fan. As a result of using a propeller/fan, the airflow through each ejector control section occurs as a blade of the propeller/fan passes over and "pumps" the flow through that particular ejector control section. The frequency of the pumping is therefore a function of the propeller's RPM and the number of propeller/fan blades. Through the proper selection of ejector geometry, propeller blade pitch, blade quantity and operating RPM, the current invention allows optimization of the pumping frequency. As an example, in the preferred embodiment, the blade pitch is tuned to provide the required thrust at a propeller speed of 2,000 rpm, such that with the selection of a five-blade propeller, the pumping frequency in each ejector control section is 172 Hz.

In accordance with the invention, control is accomplished by activating the actuators within an individual ejector control section, or within multiple ejector control sections, for example by activating sequential control sections. By switching the position of a set of actuators within a control section from the open position to the closed position, the captured thrust is redirected at that location, thereby canceling thrust augmentation. This, in turn, causes the ducted fan to tilt toward that control section. If the actuators within several adjacent control sections are closed simultaneously, the tilting force is greater, and the rate of tilt increases.

When all actuators are closed in unison, the thrust captured by the inner cowling is diverted, providing a mechanism to vary the thrust of the ducted fan without varying the throttle of the engine. This approach to controlling thrust is significant for several reasons. First, it allows engine run-up to flight speed, while reducing its thrust to prohibit taking flight, effectively acting as a parking brake. Prior to the development of the current invention, this was only feasible with an articulated rotor, not a fixed pitch system. Second, the ability to vary the thrust of the ducted fan while running the motor at constant speed permits the use of engines that possess low torque or operate most efficiently at constant speed, such as gas turbine engines. Previously this type of power plant has not been an option in a fixed-pitch system, as its response under load is too sluggish.

The force generated by the deployment, i.e., activation, of the actuators is non-linear, with the full effective force of an ejector control section not being generated until the actuators within the section are nearly fully deployed. As a result, fine force control with a single actuator is inherently difficult. This would be problematic if the span of an ejector control section were large, say on the order of 90 degrees, since an activated control section would generate enormous and near-instantaneous force that would not be useful for control. To resolve this issue, the present invention utilizes multiple, small ejector control sections to regulate the control force and rate of application. For example, in the preferred embodiment, and as noted above, eighteen 20-degree ejector control sections are used.

The moment generated for a particular ejector control section is a function of the distance of the ejector control section from the axis of rotation, and therefore varies with each section's position, even though the force they generate is the same. Table I illustrates this aspect of the invention for a single duct platform utilizing a 60 inch ducted fan with a force of 4.8 lbs.

TABLE I

| Ejector ID | Position (degrees) | Lever Arm Lateral | Long. (ft lbs) | Moment Roll (ft lbs) | Pitch (ft lbs) |
|---|---|---|---|---|---|
| 1 | 0-20 | 0.0 | 31.0 | 0.0 | 12.3 |
| 2 | 20-40 | 10.6 | 29.1 | 4.2 | 11.6 |
| 3 | 40-60 | 19.9 | 23.7 | 7.9 | 9.5 |
| 4 | 60-80 | 26.8 | 15.5 | 10.7 | 6.2 |
| 5 | 80-100 | 30.5 | 5.4 | 12.2 | 2.1 |
| 6 | 100-120 | 30.5 | -5.4 | 12.2 | -2.1 |
| 7 | 120-140 | 26.8 | -15.5 | 10.7 | -6.2 |
| 8 | 140-160 | 19.9 | -23.7 | 7.9 | -9.5 |
| 9 | 160-180 | 10.6 | -29.1 | 4.2 | -11.6 |
| 10 | 180-200 | 0.0 | -31.0 | 0.0 | -12.3 |
| 11 | 200-220 | -10.6 | -29.1 | -4.2 | -11.6 |
| 12 | 220-240 | -19.9 | -23.7 | -7.9 | -9.5 |
| 13 | 240-260 | -26.8 | -15.5 | -10.7 | -6.2 |
| 14 | 260-280 | -30.5 | -5.4 | -12.2 | -2.1 |
| 15 | 280-300 | -30.5 | 5.4 | -12.2 | 2.1 |
| 16 | 300-320 | -26.8 | 15.5 | -10.7 | 6.2 |
| 17 | 320-340 | -19.9 | 23.7 | -7.9 | 9.5 |
| 18 | 340-360 | -10.6 | 29.1 | -4.2 | 11.6 |

The control offered by the present invention is advantageous for a powered lift vehicle as control is a function of generating moments rather than forces. Therefore by selectively activating specific ejector control sections, fine craft control may be achieved.

The non-linearity of the actuator operation is beneficial in another way, as it allows the use of low-cost and reliable solenoid actuators. These devices operate similarly to a linear actuator, but with the simplicity of only two positions; compressed and fully extended.

As previously noted, the ejector configuration of the present invention may be used without the actuators in order to provide an effective means of augmenting the thrust of a ducted fan. While this configuration does not offer the control system of the preferred embodiment described above, this configuration still provides thrust augmentation.

Figure 11:
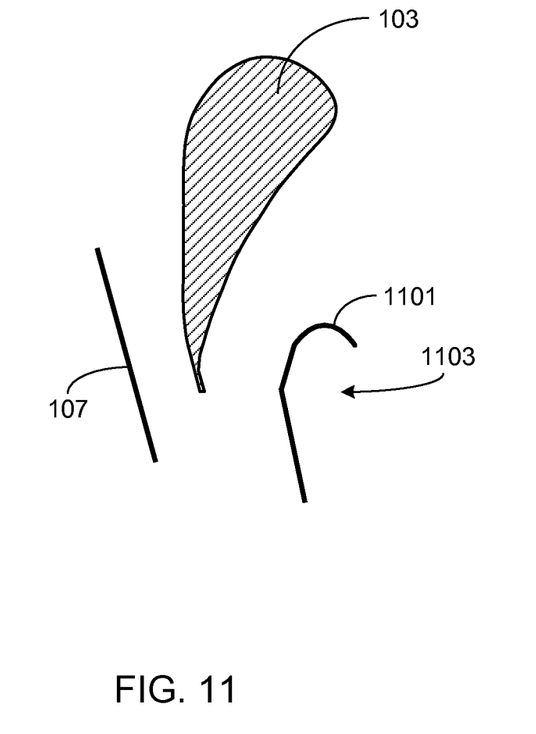
FIG. 11 provides a cross-sectional view of the inner and outer cowlings, with the outer cowling including a curved lip.

It will be appreciated that the above-described embodiment(s) may be modified without departing from the basic elements, and thus the benefits, of the invention. For example, the exact shape of the ejectors, the type of actuator control (e.g., control cable, electro-mechanical servos, etc.), the actuator mechanism, the number of ejector control sections, etc. may all be modified. FIG. 11 illustrates one such modification in which the shape of the ejectors has been modified from that shown in FIGS. 3, 4, and 7-10. More specifically, the cross-sectional view of FIG. 11 illustrates the addition of a curved inlet lip 1101 to outer cowling 1103. Curved lip 1101 may be added to an ejector that is only used for thrust augmentation as preferred, or an ejector that includes actuators in order to provide control as described in detail above. Note that FIG. 11 does not show actuators or the propeller/fan for clarity.

Vehicle Integration

There are many unconventional configurations of ducted fan vertical take-off and landing (VTOL) aircraft, with the two primary configurations being single and tandem duct VTOL platforms. Accordingly, application of the present invention to each of these configurations is discussed briefly below.

Single Duct Platform

The single duct platform was popularized by Hiller in the 1940's and continues as a viable platform to this day for small diameter, unmanned aerial vehicles (UAVs). In this configuration, the single ducted fan is the aerial platform. Control is typically through control surfaces placed in the downwash to induce controlling moments. Control of these vehicles is not typically defined in terms of pitch and roll as the advantage of this type of platform is that it can move forward with any heading. To simplify the following description, however, this convention will be followed.

Integrating the control ejectors of the present invention provides a positive means of pitch and roll control that is independent of altitude, and thus ground effect. In such a craft, preferably yaw control would remain the task of conventional control surfaces. The benefit of coupling the ejector control sections with conventional control surfaces is twofold. First, in this configuration the control surfaces are only used for yaw control and therefore control surface saturation is not an issue. Second, as the ejectors of the present invention produce a flow field with less swirl, the effectiveness of the control surfaces is improved. Additionally, the actuators of the present invention may be configured to act as stators when open, thus providing a means of countering the torque of the propeller and eliminating the need for a counter-rotating propeller or separate stator vanes.

It will be appreciated that there are numerous ways of integrating the ejector control sections of the present invention into a suitable control system. For example, activation of each of the ejector control sections may be under the control of the pilot. Alternately, every other ejector control section may be placed under the control of the pilot while the remaining control sections are controlled by the vehicle's flight computer to provide stability and alleviation from gust upsets. Alternately, all of the ejector control sections may be controlled by a flight computer.

Tandem Duct Platform

Tandem duct platforms are generally configured with two ducts in approximately the same plane with the forward direction of motion being on a vector drawn through their centerlines. Alternately, the ducted fans may be located above the center of gravity, much higher above the ground, with the forward direction of travel being along a line between them. Although less stable than the former configuration, this approach helps to eliminate the adverse effects of ground effect. While the present invention may be used with either tandem configuration, the exemplary application described herein and shown in FIG. 12 utilizes the former configuration. Tandem duct platform 1200 includes a forward ducted fan 1201, an aft ducted fan 1203, and a frame 1205. It will be appreciated that a tandem duct platform may use any of a variety of vehicle frames and frame 1205 is only representative of such a frame. To simplify this figure, many features of platform 1200 have been removed from FIG. 12, such as the propellers, control system, etc.

In platform 1200, the ejectors for the two ducted fans 1201/1203 are labeled sequentially from 1 to 18 in a clockwise direction as shown. Using this convention, the longitudinal (roll) axis 1207 goes through the number 1 and 10 ejectors of each duct, and the longitudinal axis and forward motion vector is defined as movement toward the number 1 ejectors. The laterally (pitch) axis 1209 is then defined as a line perpendicular to the longitudinal axis 1207 in the plane of the ducts, located equidistant between them, as shown in FIG. 12.

In the basic form described above, actuating ejector 7 in duct 1201 and ejector 4 in duct 1203 will produce a rolling moment toward those ejectors about the longitudinal axis 1207, with a moment equal to the control force of 2 ejectors multiplied by the ejector distance from the longitudinal axis. By selectively actuating ejectors close to the vehicle center to induce roll (e.g., ejectors 7/8 and duct 1201 and ejectors 3/4 in duct 1203), the longitudinal distance is by geometry minimized such that thrust differentials between ducts does not generate pitch moments. This is an example of the reduced control coupling that is inherent in the system of the present invention.

Figure 12:
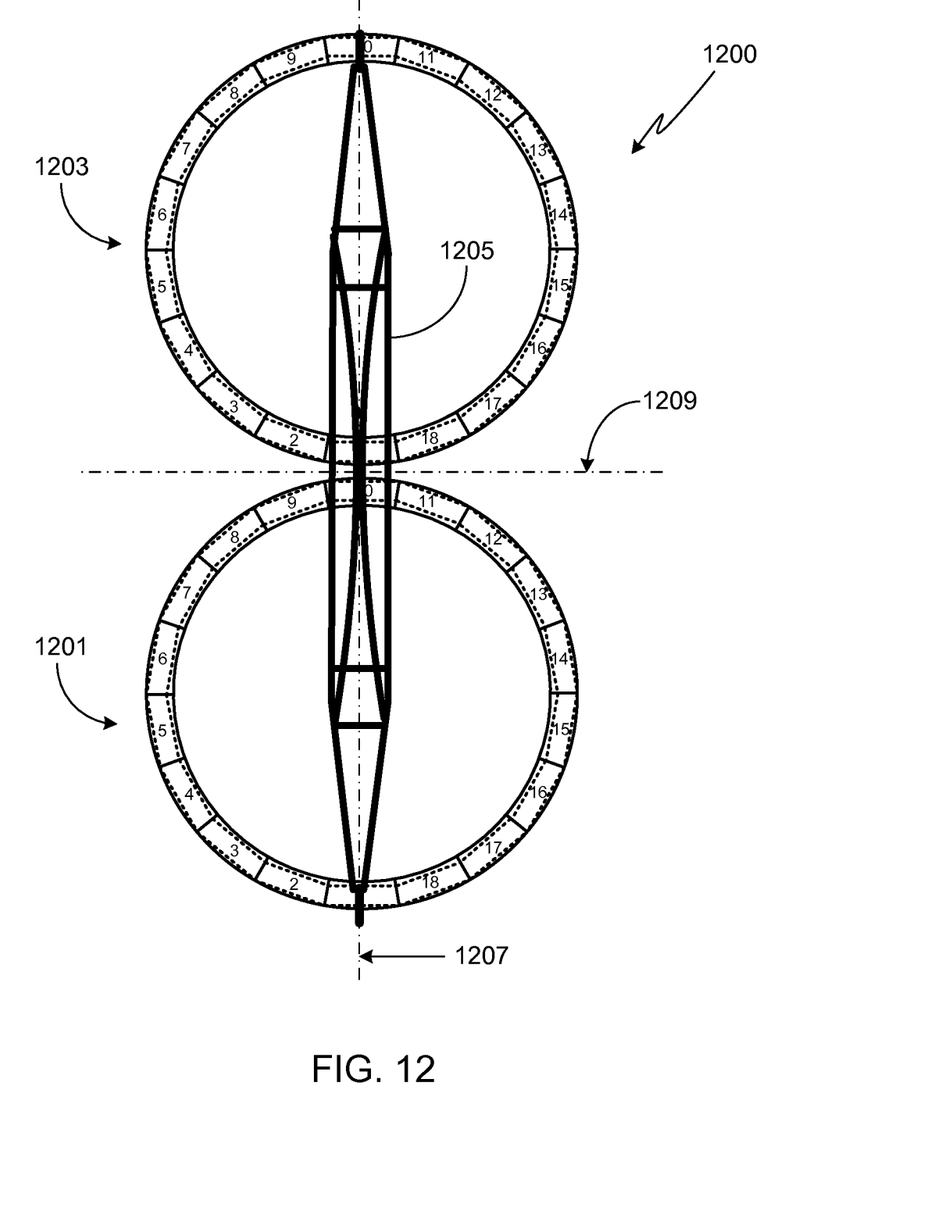
FIG. 12 provides an ejector layout for an exemplary tandem duct aircraft.

In a 600 pound test aircraft utilizing the invention and based on the design shown in FIG. 12, adequate vehicle control was achieved utilizing all ejector control sections 2, 3, 4, 7, 8, 12, 13, 16, 17, and 18 in forward duct 1201, and ejector control sections 3, 4, 9, 8, 11, 12, 16 and 17 in aft duct 1203. While additional ejector control sections may be employed in such a configuration to provide additional control authority, this number of ejector control sections is adequate, leaving the remaining ejectors for use with an automated stability and/or wind gust alleviation control system. Note that there are six ejectors (i.e., 2, 3, 4, 16, 17 and 18) employed in the front ducted fan 1201 for pitch-down, but only four ejectors (i.e., 8, 9, 11 and 12) in the aft ducted fan 1203 for pitch-up. The difference in the number of ejector control sections used for pitch-down versus pitch-up is to counter the self-righting tendency of this type of aircraft as forward speed is increased, while the aft ejectors are used only to flare to a stop. Utilizing the ejector control sections noted above, this exemplary configuration generates the control moments shown in Tables II-V, below. Note that in Tables II-V, the letter "A" before an ejector reference number indicates it is an ejector corresponding to aft ducted fan 1203. Similarly, the letter "F" before an ejector reference number indicates it is an ejector corresponding to forward ducted fan 1201.

TABLE II

Pitch Forward Control Moments

| Ejector | Arm | AC-Lever | Moment (ft-lbs) |
|---|---|---|---|
| F2/F18 | 29.1 | 6.1 | 58.5 |
| F3/F17 | 23.7 | 5.6 | 54.2 |
| F4/F16 | 15.5 | 5.0 | 47.6 |
| | | | 160.3 |

TABLE III

Pitch Aft Control Moments

| Ejector | Arm | AC-Lever | Moment (ft-lbs) |
|---|---|---|---|
| A8/A12 | 23.7 | 5.6 | 54.2 |
| A9/A11 | 29.1 | 6.1 | 58.5 |
| | | | 112.7 |

TABLE IV

Roll Left Control Moments

| Ejector | Arm | AC-Lever | Moment (ft-lbs) |
|---|---|---|---|
| F13/A16 | 15.5 | 1.3 | 12.4 |
| F12/A17 | 23.7 | 2.0 | 19.0 |
| | | | 31.4 |

TABLE V

Roll Right Control Moments

| Ejector | Arm | AC-Lever | Moment (ft-lbs) |
|---|---|---|---|
| F7/A4 | 15.5 | 1.3 | 12.4 |
| F8/A3 | 23.7 | 2.0 | 19.0 |
| | | | 31.4 |

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An airflow augmentation system for a ducted fan, wherein said ducted fan is comprised of a duct and a propeller, the airflow augmentation system comprising: an inner cowling member, wherein said inner cowling member is mechanically mounted to an inside surface of a trailing edge of said duct via a plurality of inner cowling stand-offs, wherein said inner cowling member is mounted within the downwash of said propeller, and wherein a trailing edge of said inner cowling member extends below said trailing edge of said duct; and an outer cowling member, wherein said outer cowling member is mechanically mounted to an outside surface of said trailing edge of said duct via a plurality of outer cowling stand-offs, and wherein a trailing edge of said outer cowling member extends below said trailing edge of said duct, further comprising a plurality of actuators, wherein each of said plurality of actuators is mounted between said trailing edge of said inner cowling member and said trailing edge of said outer cowling member.

2. The airflow augmentation system of claim 1, wherein a leading edge of said inner cowling member is separated from a plane corresponding to said propeller by a distance equal to or less than 1/10 of a chord length of said propeller measured at said leading edge of said inner cowling member.

3. The airflow augmentation system of claim 1, wherein an inner surface of said inner cowling member is substantially parallel to an inner surface of said trailing edge of said duct.

4. The airflow augmentation system of claim 1, wherein an inner surface of said inner cowling member forms an angle of less than 18 degrees with a central inner surface of said duct.

5. The airflow augmentation system of claim 1, wherein an inner surface of said inner cowling member forms an angle of between 15 degrees and 18 degrees with a central inner surface of said duct.

6. The airflow augmentation system of claim 1, wherein an inner surface of said inner cowling member is separated from an adjacent inner duct surface by a distance equal to at least 10% of a radius corresponding to said propeller.

7. The airflow augmentation system of claim 1, wherein an inner surface of said inner cowling member is separated from an adjacent inner duct surface by a distance of between 5% and 15% of a radius corresponding to said propeller.

8. The airflow augmentation system of claim 1, wherein an inner surface of said inner cowling member is separated from an adjacent inner duct surface by a distance sufficient to allow said inner cowling member to capture at least 20% of the airflow created by said propeller within said duct.

9. The airflow augmentation system of claim 1, wherein a leading edge of an inner surface of said outer cowling member is substantially parallel to an adjacent outer surface of said duct.

10. The airflow augmentation system of claim 1, wherein said trailing edge of said outer cowling member is substantially parallel to said trailing edge of said inner cowling member.

11. The airflow augmentation system of claim 1, wherein said inner cowling member includes multiple pluralities of holes, said multiple pluralities of holes acting to reattach separated airflow.

12. The airflow augmentation system of claim 11, wherein each plurality of holes of said multiple pluralities of holes is located proximate an intersection of said inner cowling member and one of said inner cowling stand-offs.

13. The airflow augmentation system of claim 1, further comprising a plurality of ejector cavities, wherein each ejector cavity of said plurality of ejector cavities is comprised of a portion of said inner cowling member and a portion of said outer cowling member, and wherein adjacent ejector cavities are separated by a combination of one of said plurality of inner cowling stand-offs and one of said plurality of outer cowling stand-offs.

14. The airflow augmentation system of claim 13, wherein a single plurality of cowling stand-offs is comprised of said plurality of inner cowling stand-offs and said plurality of outer cowling stand-offs such that each of said plurality of cowling stand-offs is comprised of one of said plurality of inner cowling stand-offs and one of said plurality of outer cowling stand-offs.

15. The airflow augmentation system of claim 14, wherein an exit region corresponding to each ejector cavity of said plurality of ejector cavities is rectangularly-shaped.

16. The airflow augmentation system of claim 1, wherein a leading edge of said outer cowling member includes an outwardly curved inlet lip.

17. The airflow augmentation system of claim 1, wherein each of said plurality of actuators may be positioned within at least two positions, wherein an actuator in a first position of said at least two positions provides minimal profile to airflow passing between said inner cowling member and said duct, and wherein said actuator in a second position of said at least two positions redirects airflow entering between said inner cowling member and said duct outboard between said outer cowling member and said duct.

18. The airflow augmentation system of claim 17, wherein each of said plurality of actuators has a curvilinear shape.

19. The airflow augmentation system of claim 18, wherein a cylindrical axis corresponding to said curvilinear shape is parallel to a downward vector corresponding to primary airflow when said actuator is in said first position.

20. The airflow augmentation system of claim 17, wherein each of said plurality of actuators is shaped to enhance mixing when said actuator is in said first position, said mixing occurring between said airflow entering between said inner cowling member and said duct and entrained airflow entering between outer cowling member and said duct.

21. The airflow augmentation system of claim 17, further comprising a control system coupled to said plurality of actuators, wherein said control system allows a user to select between said first position and said second position for each of said plurality of actuators.

22. The airflow augmentation system of claim 21, wherein said control system allows said user to individually select between said first position and said second position for each of said plurality of actuators.

23. The airflow augmentation system of claim 21, wherein said plurality of actuators is comprised of multiple actuator groups, wherein each actuator group is comprised of multiple individual actuators, and wherein said control system allows said user to select between said first position and said second position for individual actuator groups.

24. The airflow augmentation system of claim 23, further comprising a plurality of ejector control sections, wherein each ejector control section of said plurality of ejector control sections is comprised of a portion of said inner cowling member and a portion of said outer cowling member, wherein adjacent ejector control sections are separated by a combination of one of said plurality of inner cowling stand-offs and one of said plurality of outer cowling stand-offs, and wherein each actuator group corresponds to one of said plurality of ejector control sections.

25. The airflow augmentation system of claim 24, wherein a single plurality of cowling stand-offs is comprised of said plurality of inner cowling stand-offs and said plurality of outer cowling stand-offs such that each of said plurality of cowling stand-offs is comprised of one of said plurality of inner cowling stand-offs and one of said plurality of outer cowling stand-offs.

26. The airflow augmentation system of claim 24, wherein an exit region corresponding to each ejector control section of said plurality of ejector control sections is rectangularly-shaped.

27. The airflow augmentation system of claim 24, wherein each of said plurality of ejector control sections is of the same size.

28. The airflow augmentation system of claim 21, wherein said control system controls said position of said plurality of actuators via control cables.

29. The airflow augmentation system of claim 21, wherein said control system controls said position of said plurality of actuators via electro-mechanical servos.

* * * * *